United States Patent [19]
Cowan et al.

[11] Patent Number: 5,263,077
[45] Date of Patent: * Nov. 16, 1993

[54] FILM CHANGER HAVING FILM-RECEIVING, NONDRIVEN CASSETTE WITH SPIRAL-SHAPED GUIDE PLATE

[75] Inventors: Kevin P. Cowan; Bruno Fazi, Jr., both of Allison Park; Joseph B. Havrill, Pittsburgh; Stanley R. Lewandowski, Cheswick; David M. Reilly, Glenshaw, all of Pa.

[73] Assignee: Medrad, Inc., Pittsburgh, Pa.

[*] Notice: The portion of the term of this patent subsequent to May 21, 2008 has been disclaimed.

[21] Appl. No.: 691,966

[22] Filed: Apr. 26, 1991

Related U.S. Application Data

[63] Continuation of Ser. No. 271,457, Nov. 15, 1988, Pat. No. 5,018,182.

[51] Int. Cl.$^5$ .............................................. G03B 42/02
[52] U.S. Cl. ............................................ 378/173; 378/210
[58] Field of Search .......................................... 378/173

[56] References Cited

U.S. PATENT DOCUMENTS

| | | |
|---|---|---|
| 2,622,206 | 12/1952 | Passannante . |
| 3,306,491 | 2/1967 | Eisner et al. . |
| 3,440,422 | 4/1969 | Ball et al. . |
| 3,511,496 | 5/1970 | Zoglmann . |
| 3,553,453 | 1/1971 | Hogan . |
| 3,567,931 | 3/1971 | Eelkema . |
| 3,636,351 | 1/1972 | Lajus . |
| 3,672,279 | 6/1972 | Hackenberg et al. . |
| 3,710,106 | 1/1973 | Loucheur et al. . |
| 3,724,352 | 4/1973 | Shimomura . |
| 3,735,130 | 5/1973 | Bock et al. . |
| 3,775,613 | 11/1973 | Hommerin . |
| 3,807,726 | 4/1974 | Hope et al. . |
| 3,827,070 | 7/1974 | Hoerenz et al. . |
| 3,862,426 | 1/1975 | Thomas . |
| 3,865,482 | 2/1975 | Bendall et al. . |
| 3,891,850 | 6/1975 | Bridgeman . |
| 3,908,984 | 9/1975 | Sohngen . |
| 3,967,126 | 6/1976 | Otto, Jr. . |
| 3,989,950 | 11/1976 | Hunt et al. . |
| 3,998,118 | 12/1976 | Brophy et al. . |
| 4,006,985 | 2/1977 | Hutner . |

(List continued on next page.)

FOREIGN PATENT DOCUMENTS

| | | |
|---|---|---|
| 714921 | 12/1941 | Fed. Rep. of Germany . |
| 1931645 | 12/1970 | Fed. Rep. of Germany . |
| 2356252 | 4/1975 | Fed. Rep. of Germany . |
| 2456448 | 8/1976 | Fed. Rep. of Germany . |
| 2745994 | 4/1979 | Fed. Rep. of Germany . |
| 57-67432 | 4/1982 | Japan . |
| 61-254430 | 11/1986 | Japan . |
| WO87/03107 | 5/1987 | PCT Int'l Appl. . |
| 300 | 7/1906 | United Kingdom . |
| 1096802 | 12/1967 | United Kingdom . |
| 1189914 | 4/1970 | United Kingdom . |

Primary Examiner—Craig E. Church
Attorney, Agent, or Firm—Keck, Mahin & Cate

[57] ABSTRACT

An x-ray film changer includes a removably mounted, passive-type cassette having no film driving mechanism and comprising a film-receiving spiral guide plate extending within the cassette in excess of one and one-half 360° turns. The cassette further comprises an anvil bar for reverse bending of the guide plate when the cassette is opened, to facilitate film removal, a light-blocking gate which uncovers a film feed-in slot in response to mounting of the cassette on a film exposure device, and a combination carrying handle-latch mechanism. The film changer further includes a tachometer generator-timing circuit delay system for varying the lead time of a firing command to an x-ray generator in response to the speed of an approaching film, a transversely extending, pivotable film stop-and-orienting bar synchronized with film clamping and feed mechanisms, a film anti-bounce mechanism an indicia printing mechanism having a liquid crystal display with a backlighted electroluminescent panel, and film feed sensors for detecting film misfeeds and an unacceptable number of film "short feed" conditions in a film sequence.

38 Claims, 7 Drawing Sheets

U.S. PATENT DOCUMENTS

| | | |
|---|---|---|
| 4,017,877 | 4/1977 | Powers . |
| 4,025,187 | 5/1977 | Taylor et al. . |
| 4,199,687 | 4/1980 | Brendl et al. . |
| 4,204,668 | 5/1980 | Yanagawa . |
| 4,234,796 | 11/1980 | Caugant et al. . |
| 4,250,389 | 2/1981 | Brendl et al. . |
| 4,300,757 | 11/1981 | Koiso et al. . |
| 4,317,999 | 3/1982 | Amtmann et al. . |
| 4,342,510 | 8/1987 | Guillame . |
| 4,346,297 | 8/1982 | Suzuki et al. . |
| 4,355,791 | 10/1982 | Villa . |
| 4,417,356 | 11/1983 | Hoffman . |
| 4,418,420 | 11/1983 | Bauer et al. . |
| 4,428,658 | 1/1984 | Moore et al. . |
| 4,447,053 | 5/1984 | Wager et al. . |
| 4,482,232 | 11/1984 | Engelsmann et al. . |
| 4,521,097 | 6/1985 | Kuehnle et al. . |
| 4,566,785 | 1/1986 | Takenouchi . |
| 4,597,097 | 6/1986 | Suzuki . |
| 4,697,902 | 10/1987 | Maehara et al. . |
| 4,712,227 | 12/1987 | Warden . |
| 4,782,504 | 11/1988 | Weber et al. . |
| 4,893,322 | 1/1990 | Hellmick et al. . |
| 4,924,486 | 5/1990 | Weber et al. . |

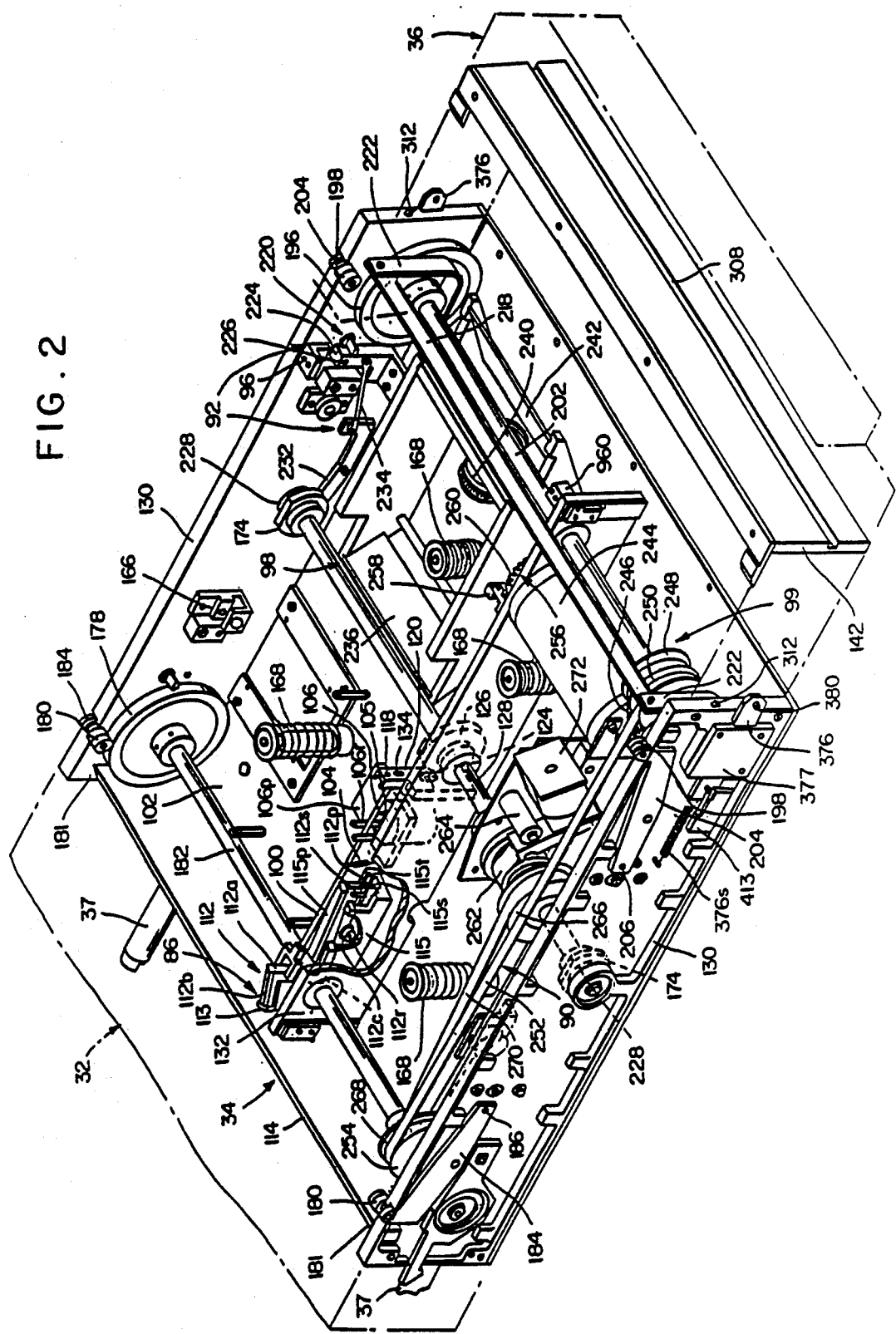

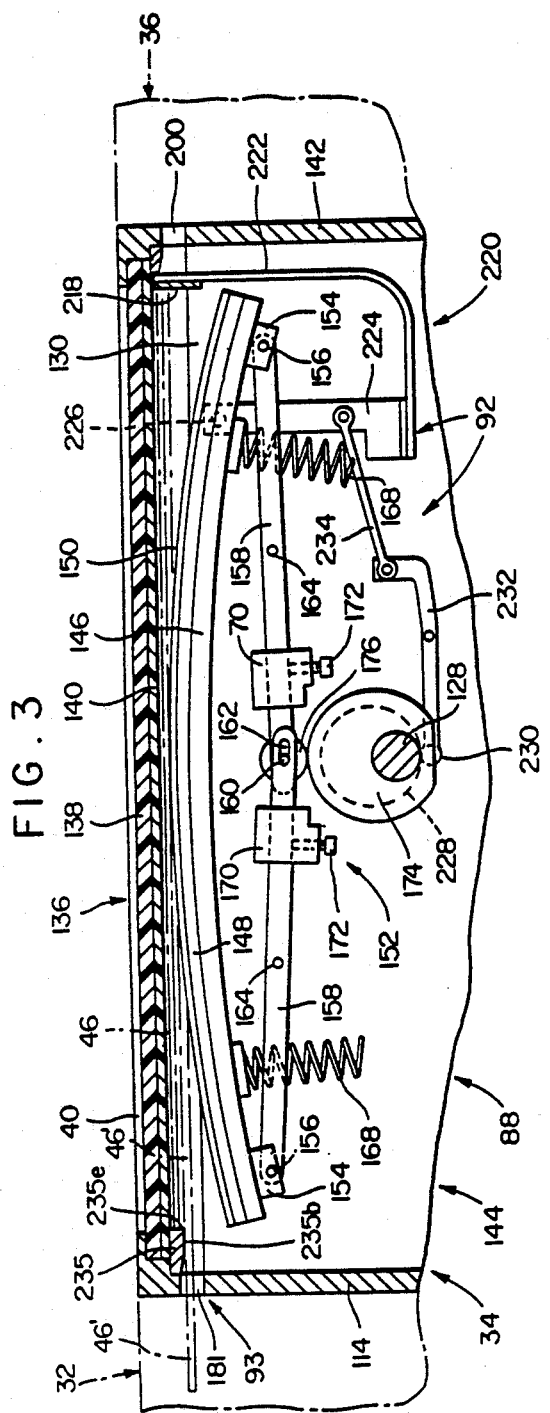
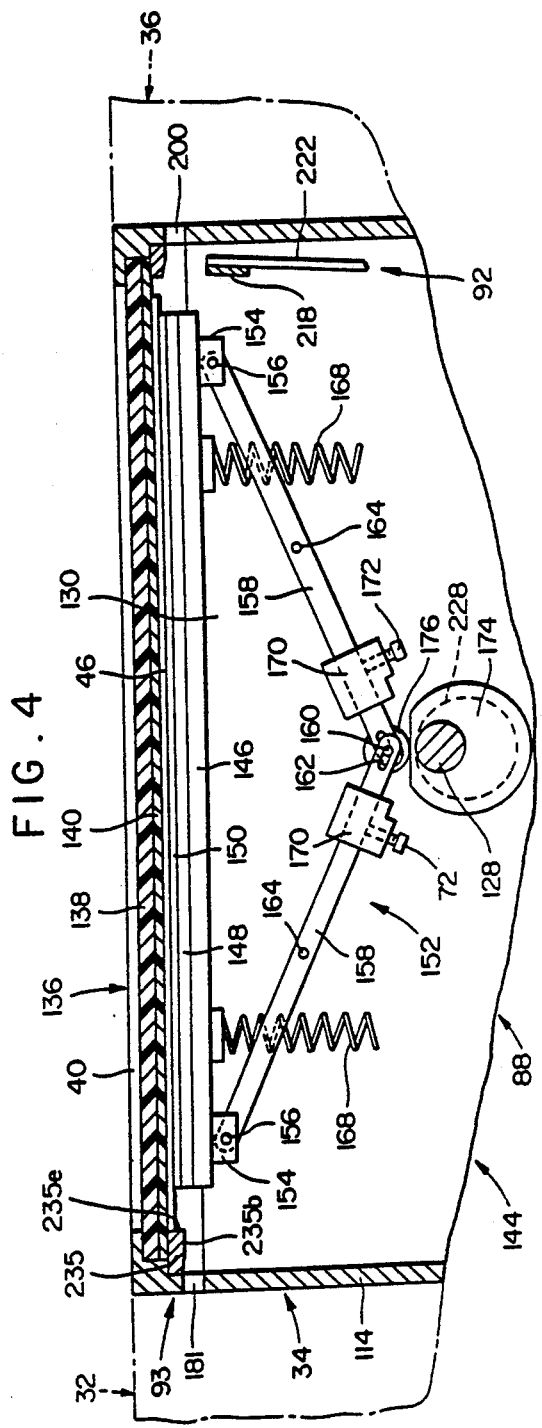

FILM CHANGER HAVING FILM-RECEIVING, NONDRIVEN CASSETTE WITH SPIRAL-SHAPED GUIDE PLATE

This is a continuation of application Ser. No. 07/271,457, filed Nov. 15, 1988, now U.S. Pat. No. 5,018,182.

FIELD OF THE INVENTION

This invention relates to a film changer, and more specifically to an x-ray film changer having an exposed film-receiving cassette which is of a passive type having no film driving mechanism and which is of simple, inexpensive and light-weight construction, so that it can be readily mounted upon and removed from an exposure device of the film changer and manually transported between the film changer exposure device and a developing room.

DESCRIPTION OF THE PRIOR ART

Known x-ray film changers comprise a magazine for holding sheets of precut x-ray films, an x-ray film exposure device for holding a sheet of x-ray film during exposure of the film to x-rays from an x-ray generator, and a receiving tray into which each exposed sheet of film is fed after an exposure operation. For example, the exposed sheet of film may feed out of the exposure device into a feed tunnel and around a feed-out discharge roller into the receiving tray, which is located beneath the exposure device.

The construction and operation of prior art film changers frequently is such that they tend to scratch the film as the film is fed through the changer, and also tend to build up static electricity on the film, which tends to discharge at isolated points as the exposed film is fed to the receiving tray, or is subsequently removed from the receiving tray, thereby producing an undesirable "rain tree" effect on the exposed film. Further, the receiving tray frequently is heavy and bulky, causing inconvenient handling by the machine operators. An example of a prior known receiving tray is disclosed in U.S. Pat. No. 3,636,351, issued Jan. 18, 1972, to P. Lajus. Further, other film-receivers, having a generally semi-circular shape, are disclosed in U.S. Pat. No. 3,735,130 to J. W. Bock et al., issued May 22, 1973, and U.S. Pat. No. 4,234,796 to J. Caugant et al., issued Nov. 18, 1980.

Another type of film-receiving cassette is disclosed in the German paten document No. 1,931,645 to H. Berger. This film-receiving cassette is of a power driven-type and includes a driven film transport mechanism in the cassette, comprising a plurality of opposed motorized gear rollers and a series of idler rollers mounted in the cassette sidewalls. In the Berger apparatus, film is fed from a continuous roll through an exposure position and into the cassette, by film feeding rolls adjacent an entrance end of a film exposure device. As the film is initially received in the cassette, a leading film section feeds into the drive rollers, is cut off by a knife, and then is forcibly driven by the drive rollers into the remainder of the cassette. As the initial film is fed into the cassette, the film feeds in a spiral path defined by the idler rollers, with a leading end of the film subsequently engaging a trailing portion thereof, whereupon the film tends to become coiled within itself. As the drive rollers then drive the next film into the cassette, this film is forcibly driven between opposed mating surfaces of the first film and tends to become coiled up within the first film, with the first film tending to be rotated in the receiver by the second film. This process then is repeated for subsequently received films, with each film being forcibly driven into an internally coiled relationship within the preceding films and preceding films tending to be rotated by subsequent films. As a result, the trailing edges of the films tend to become misaligned during the feed-in operation, making it difficult to remove the films en masse in an unloading operation.

Accordingly, a primary purpose of this invention is to provide an exposed film-receiving cassette for use with an x-ray film changer, wherein the cassette is of a passive type which has no film driving mechanism and which is of simple, inexpensive, light-weight and compact construction, so that it can be readily mounted upon and removed from an exposure device of the film changer and transported between the film changer exposure device and a developing room. More specifically, the subject invention is directed to improvements in a film-receiving cassette and to other improvements in a film exposure device, of an x-ray film changer which is disclosed and claimed in copending application Ser. No. 798,310, filed Nov. 15, 1985, entitled "Film Changer", now U.S. Pat. No. 4,893,322, and assigned to the same Assignee as this application.

Summary of the Invention

In general, an x-ray film changer includes a passive type cassette for receiving an exposed film from a film exposure device, with the cassette having no film driving mechanism. The cassette comprises an essentially box-shaped housing having front, rear and bottom walls, an open top, and a film-receiving feed-in slot in the front wall. A guide plate is formed into an inwardly spiraled configuration having an outer open end and an inner end, such that a film fed into the open end of the spiral configuration through the feed-in slot and along an interior surface of the guide plate, assumes a configuration corresponding to that of the guide plate, to facilitate storage of the film in a small space. The open top of the box-shaped housing is provided with a cover having a first end pivotally mounted on the box-shaped housing adjacent the housing rear wall and having a second end which opens adjacent the housing front wall upon pivoting of the cover. Further, the guide plate has an entrance end fixed to the second end of the cover so that opening of the cover exposes the interior of the guide plate for removal of film therefrom, with a releasable mechanism being provided for retaining the cover in a closed position.

More specifically, the cassette cover is pivoted on an anvil bar mechanism extending between the sidewalls of the box-shaped member. The anvil bar mechanism also is engageable with the guide plate to limit movement of a portion of the guide plate as the cover is moved to an open position, so that the guide plate becomes reverse bent away from outer end portions of exposed sheet films in the cassette, to facilitate removal of the films.

Further, a light-blocking gate is movably mounted adjacent the front wall of the box-shaped housing and is biased by a resilient mechanism into covering relationship over the film-receiving feed-in slot in the housing front wall. The light-blocking gate is movable to an uncovering relationship with respect to the feed-in slot in response to vertical movement of the cassette as it is mounted on the film exposure device. For this purpose, movement of the light-blocking gate to its uncovering position may be accomplished by fixed lugs on the film exposure device engageable with projecting lugs on the light-blocking gate.

A combination carrying handle-latch mechanism also is movably mounted on the box-shaped housing, and is movable between a latching position for securing the cassette to the film-exposure device, and an unlatching position for removing the cassette from the film-exposure device. As the combination carrying handle-latch mechanism is manually moved to the latching position by an operator, the mechanism provides a tactile feedback to the operator indicating when the cassette has become properly latched in position. The carrying handle of the combination carrying handle-latch mechanism also engages over the top cover in locking relationship in the latching position and the mechanism is resiliently biased into the unlatching position.

Another feature of the invention involves the use of a tachometer in a film exposure device and driven by a film changer drive motor, for measuring the speed of the drive motor in the film exposure device, and thus each film, as the film approaches the film exposure position. The tachometer feeds a signal to a programmable timing circuit delay mechanism which varies the delay between the time at which a firing command is transmitted to an x-ray generator, in response to the speed of the film, so that the films are exposed at an optimum rate. In addition, the tachometer provides a feedback control for the film changer drive motor.

An additional feature of the invention includes a pivotally mounted, elongated film stop-and-orienting bar extending essentially across the width of the film exposure device for precluding overfeed of the sheet of film into the exposure position. At the same time, the stop bar is engageable along its length by the leading edge of the film, to orient the film in the exposure position. The stop bar is movable into and out of the path of travel of the film by a cam on a film changer drive shaft which also includes another cam for operating a film clamping mechanism.

Another feature of the invention involves the use of a film anti-bounce bar at an entrance end of the film exposure device, for preventing a film from bouncing backward upon engaging the film stop-and-orienting bar, whereby the two bars cooperate to locate the film in a proper exposure position.

A further feature of the invention involves the use of a liquid crystal display with a backlighted electroluminescent panel, which forms part of an indicia printing mechanism, for printing indicia on the film.

Another feature of the invention involves the use of optical sensing devices adjacent the exit end of the film exposure device, for detecting film misfeeds and selectively interrupting operation of the apparatus.

An additional feature of the invention involves an improved film feed actuating mechanism in the film exposure device for operating a film feeding mechanism in the film magazine.

BRIEF DESCRIPTION OF THE DRAWINGS

FIG. 2 is an isometric view of an interior portion of the film exposure device of the film changer in accordance with the invention, with upper portions and side covers of the device removed;

FIG. 3 is a cross-sectional view of the film clamping mechanism of the film exposure device in an open film-receiving position;

FIG. 4 is a cross-sectional view of the film clamping mechanism shown in FIG. 3, in a closed film-clamping position;

DETAILED DESCRIPTION OF THE DRAWINGS

Figure 1:
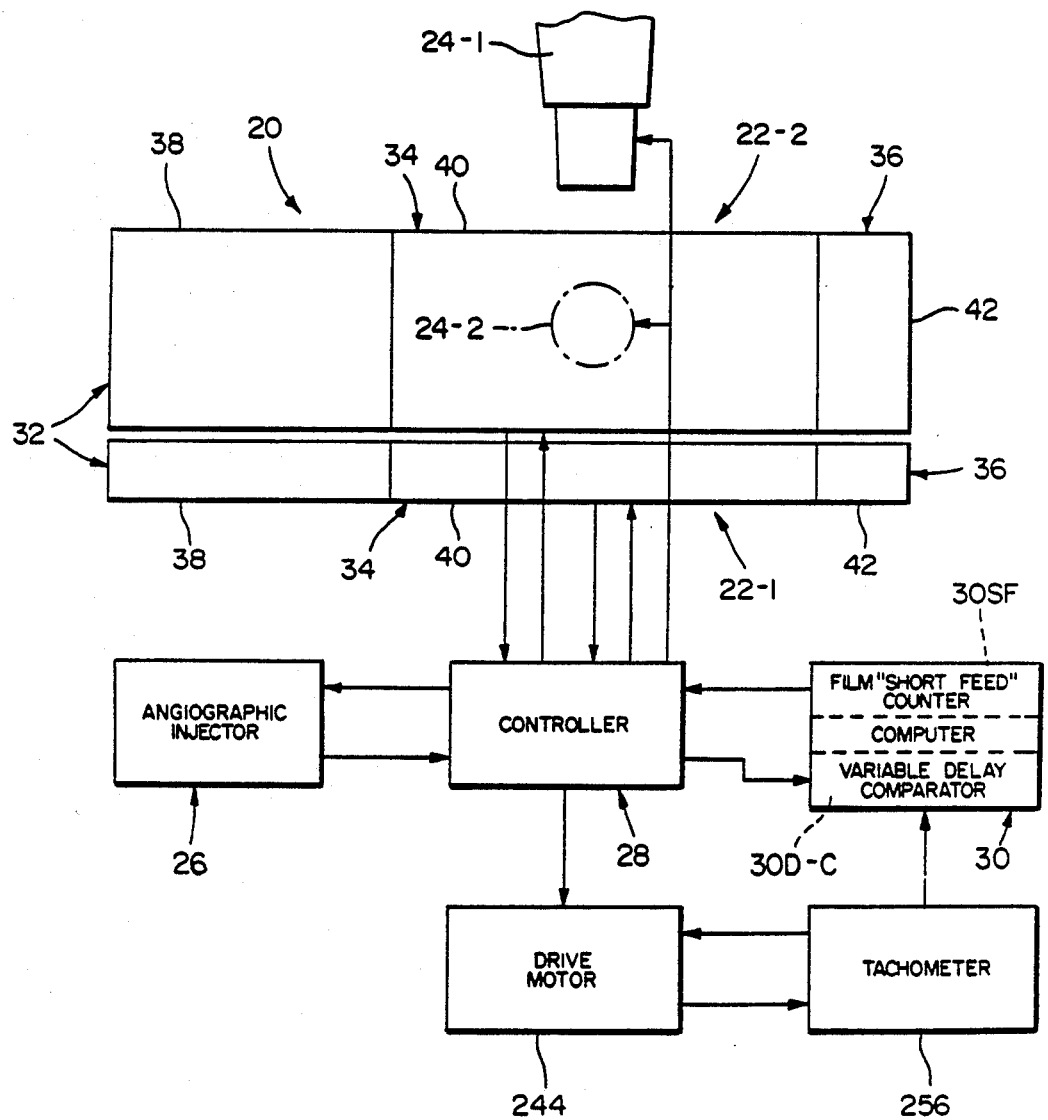
FIG. 1 is a schematic view of a film changing system in accordance with the invention, in association with an angiographic injector.

Referring to FIG. 1, a system 20 of a type to which the invention relates may comprise a first x-ray film changer 22-1 arranged in a horizontal plane and a second x-ray film changer 22-2 arranged in a vertical plane perpendicular to the horizontal plane, for producing x-rays of an object, such as a part of a human body, in two directions simultaneously. For this purpose, each of the film changers 22-1 and 22-2 is associated with a suitable x-ray generator 24-1 and 24-2, respectively, for producing the x-rays in a known manner. A system of this type is disclosed in copending U.S. application Ser. No. 798,310, filed Nov. 15, 1985, now U.S. Pat. No. 4,893,322 and U.S. application Ser. No. 801,595, filed Nov. 27, 1985, now U.S. Pat. No. 4,782,504, both assigned to the same Assignee as this application, and the disclosures of which, to the extent not inconsistent with this disclosure, are hereby incorporated by reference.

In the system 20 shown in FIG. 1, the film changers 22-1 and 22-2 are also associated with an angiographic injector 26 of a known commercial type, such as that available from Medrad, Inc., of Pittsburgh, Pa., under the trade names "Mark IV" and "Mark V", for injecting a tracer fluid, such as iodine, into the person being x-rayed, for the purpose of producing a series of x-rays in sequence at desired time intervals. The film changers 22-1 and 22-2, x-ray generators 24-1 and 24-2 and the angiographic injector 26 all are connected to a controller 28 operated from a suitably programmed computer 30. Operation of the film changers 22-1 and 22-2 individually, or synchronization of the film changers for operation in alternate or simultaneous modes is accomplished by suitable electronic control circuits in the controller 28, and precise timing is provided by the computer 30, which activates the film feed cycles in both of the film changers.

Figure 8:
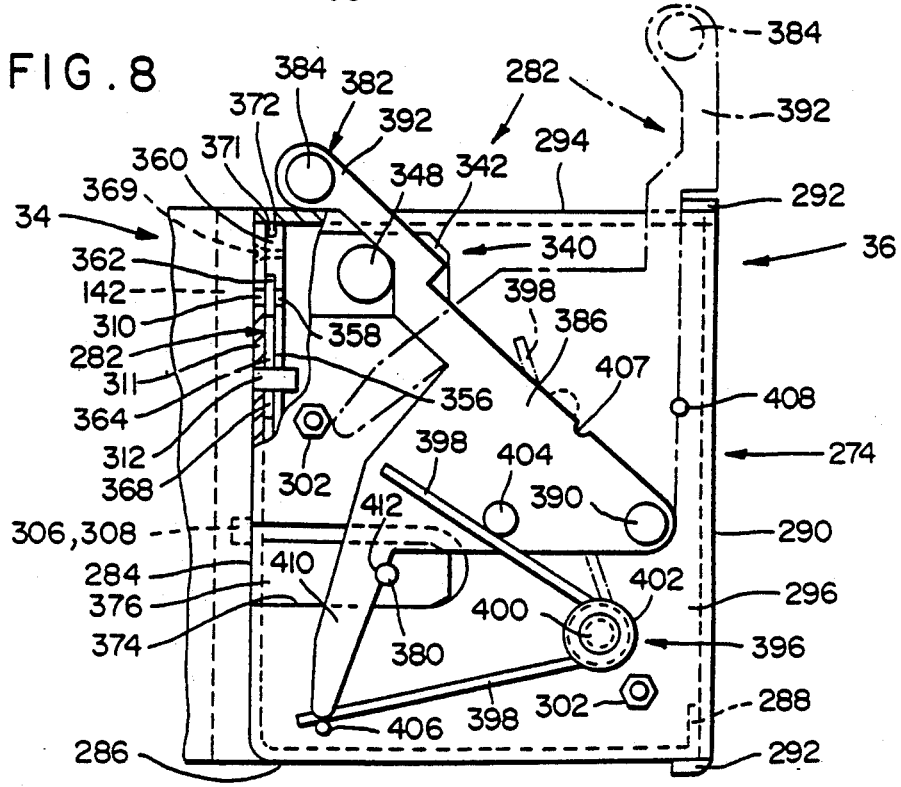
FIG. 8 is a side view of the film-receiving cassette mounted on the film exposure device for receiving exposed film therefrom.
Figure 9:
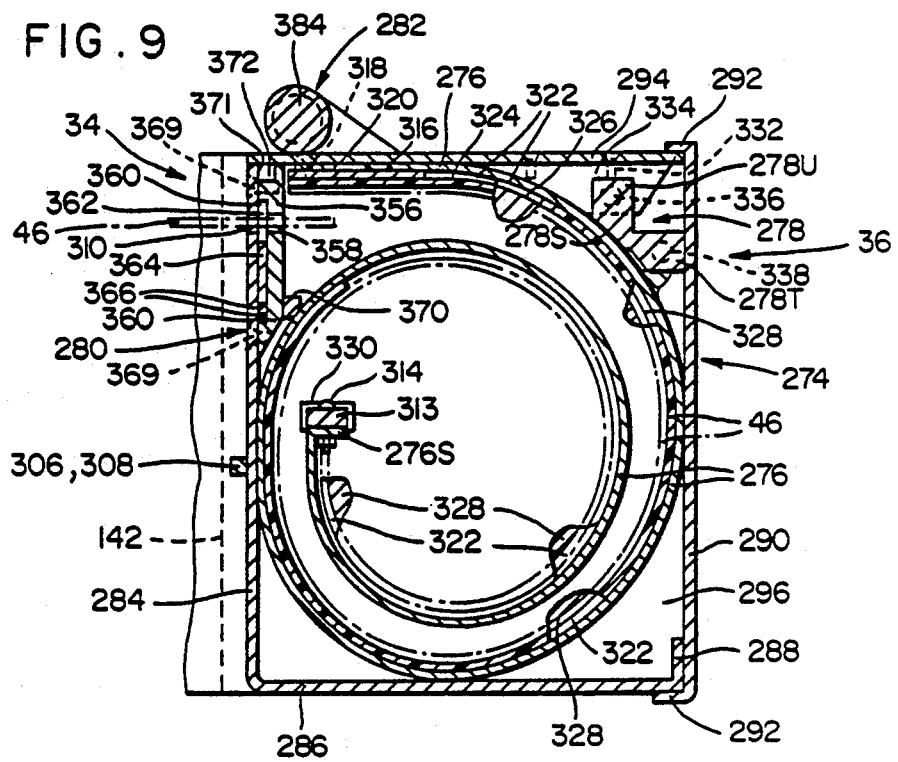
FIG. 9 is a cross-sectional view of the film-receiving cassette as shown in FIG. 8, mounted on the film exposure device.

Each of the film changers 22-1 and 22-2 includes a film magazine 32, a film exposure device 34 and an exposed film-receiving cassette 36, with the film magazine being removably mounted on projecting posts 37 (FIG. 2) of the film exposure device in a suitable manner (not shown). The film-receiving cassette 36 also is removably mounted on the film exposure device 34 as shown in FIGS. 8 and 9, and subsequently described herein.

In a film feeding operation, sheets of film 46 (one shown in FIG. 3) are fed in succession from the film magazine 32 into the film exposure device 34 by an actuating mechanism 86 (FIG. 2) in the film exposure device 34, in a manner essentially as described in detail in the aforementioned U.S. applications Ser. Nos. 798,310 and 801,595. In addition to the film feed actuating mechanism 86 (FIG. 2), the film exposure device 34 comprises a film clamping mechanism 88 (FIGS. 3 and 4) for clamping one of the sheets of film 46 in an exposure position in the device. The film exposure device 34 further includes a film feeding mechanism 90 (FIGS. 2 and 5) for feeding one of the sheets of film 46 received from the film magazine 32, into the exposure position, and for feeding the exposed sheet of film out of the exposure position into the film-receiving cassette 36 after an exposure operation. In addition, a stop mechanism 92 (FIGS. 2-5) is provided for locating and orienting the sheet of film 46 in the exposure position, a film anti-bounce mechanism 93 (FIGS. 3-5) is provided for preventing fed films 46 from bouncing backward from the stop mechanism, film-sensing devices 96i and 96o (FIG. 2), which are spaced in the direction of film travel, are provided adjacent the feed-out end of the film exposure device 34, for determining whether or not one of the sheets of film has been properly fed into and out of the exposure position, and for determining "short" films as subsequently described herein, and a printing mechanism 98 (FIG. 2) is provided for printing desired indicia along an edge portion of the film during an exposure operation. The film exposure device 34 further includes a drive mechanism 99 (FIG. 2).

Referring to FIG. 2, the film feed actuating mechanism 86 of the film exposure device 34 includes an essentially horizontally disposed coupling rod 100 biased toward a bottom wall 102 of the device by a coil spring 104 and mounted for slidable horizontal movement on an upward end of a vertically moveable plunger 105 of a solenoid 106 having a support plate 106p mounted on the intermediate wall 132 and provided with spaced upstanding rod guide pins 106r. One end of the coupling rod 100 is pivotally connected to a vertical portion 112a of an essentially Z-shaped member 112 having an upper leg 112b inclined slightly downward and disposed in an aperture 113 in a frame end wall 114 in alignment with a push rod (not shown) of the abovementioned film feeding mechanism (not shown) in the film magazine 32.

A similarly inclined lower leg 112c of the Z-shaped member 112 is provided with support rollers 112r (only one shown) on opposite sides thereof, with the lower leg and rollers being reciprocable in a downwardly inclined guide slot 115s in a channel-shaped member 115 mounted on the bottom wall 102, so that the member upper leg 112b moves in the aperture 113 without binding. The rollers 112r may be supported in the guide slot 115s on suitable downwardly inclined shelves or tracks 115t and are retained in the slot 115s by downwardly inclined top plates 115p secured to upper ends of the channel-shaped member 115 and projecting partially over the slot. The Z-shaped member 112 (and rollers 112r) is biased to the right in FIG. 2 against a suitable stop pin 112s in the slot 115s, by a coil spring (not shown) the right-hand end of the slot.

With further reference to FIG. 2, an opposite end of the coupling rod 100 has a concave seat (not shown) which may be selectively engaged with a ball bearing 118 mounted in an operating lever 120 pivotally mounted at a lower end on the bottom wall 102 and biased clockwise, as viewed in FIG. 2, by a coil spring (not shown). An intermediate portion of the operating lever 120 carries a cam roller 124 engaged with an operating cam 126 on a cam shaft 128 having opposite ends journaled in frame sidewalls 130 and an intermediate portion journaled in an intermediate frame wall 132. Thus, as the cam shaft 128 rotates in an initial portion of a film feeding-and-exposure operation, the operating lever 120 will be pivoted by the cam 126 to move the coupling rod 100 to the left in FIG. 2, thereby actuating the abovementioned film feeding mechanism (not shown) in the film magazine 32.

The film feed actuating mechanism 86 may be selectively deactivated to preclude feeding of one of the sheets of film 46 from the film magazine 32, if so desired. For example, at the end of a completed film sequence in the film exposure device 34 as disclosed herein, after the last film 46 in the sequence is exposed, a new feed cycle must be initiated to feed the last exposed film out of the film exposure device to the film-receiving cassette 36. To prevent a new film 46 from being fed into the film exposure device 34 from the film magazine 32, the film feed actuating mechanism 86 is disabled. For this purpose, as is illustrated in FIG. 2, the operating lever 120 is provided with a vertical slot 134 therethrough. When it is desired to deactivate the actuating mechanism 86, the solenoid 106 is operated to permit the coupling rod 100 to be moved vertically downward by the spring 104, thereby aligning the right-hand end of the rod, as viewed in FIG. 2, with the slot 134 in the operating lever 120. Accordingly, when the operating lever 120 then is pivoted by the operating cam 126, the adjacent end of the coupling rod 100 merely passes through the slot 134 in the operating lever without causing operation of the film feeding mechanism in the film magazine 32.

Referring to FIGS. 3 and 4, the film clamping mechanism 88 of the film exposure device 34 includes an upper clamping assembly 136 in the form of a backing plate 138 of a suitable carbon fiber composite material and an upper x-ray intensifying screen 140 bonded or otherwise suitably mounted to the underside of the upper backing plate. The upper backing plate 138 and the upper x-ray intensifying screen 140 are fixedly mounted on the upper end of the frame end wall 114 and an opposite frame end wall 142 of the film exposure device 34. In use, an object to be x-rayed, such as a portion of a human body, is positioned on the upper backing plate 138 in a known manner.

The film clamping mechanism 88 further includes a lower clamping assembly 144 comprising a lower pressure plate 146 formed of a suitable light-weight, flexible material, such as a carbon fiber composite a foam pad 148 may be bonded to the top of the pressure plate 146, and a second x-ray intensifying screen 150 is bonded or otherwise suitably mounted on top of the foam pad (if used) or directly on the top of the pressure plate. After one of the sheets of film 46 has been fed into the exposure position in the film exposure device 34, as illustrated in FIG. 3, the lower clamping assembly 144 is moved upwardly to clamp the sheet of film against the upper x-ray intensifying screen 140, as shown in FIG. 4.

The lower clamping assembly 144 is moved toward and away from the upper clamping assembly 136 by a mechanism 152 as shown in FIGS. 3 and 4. More specifically, opposite ends of the pressure plate 146 are provided with respective pairs of transversely spaced depending lugs 154 which are pivotally connected by pins 156 to upper ends of respective pairs of operating levers 158. Lower ends of the operating levers 158 are pivoted on a transversely extending pivot shaft 160, with one of the levers including a lost motion connection comprising an elongated longitudinally extending slot 162 in the lower end of the lever. The operating levers 158 also have intermediate portions pivotally mounted on respective transversely extending pivot shafts or pins 164 mounted in lugs 166 (FIG. 2) on the frame sidewalls 130 of the film exposure device 34.

Outer ends of the lower clamping assembly 144 are biased upwardly by coil springs 168 mounted between the bottom surface of the pressure plate 146 and the bottom wall 102 (FIG. 2). Further, the weight of the lower clamping assembly 144 is counterbalanced by counterweights 170 slidably mounted on lower portions of the operating levers 158 and adjustably secured on the operating levers by set screws 172. Thus, the coil springs 168 and the counterweights 170 cooperate such that the coil springs can readily move the lower clamping assembly 144 upwardly into a film clamping position as shown in FIG. 4, and provide a construction in which the lower clamping assembly is essentially free-floating.

The lower clamping assembly moving mechanism 152 further comprises a pair of operating cams 174 secured to the cam shaft 128. The operating cams 174 are engaged with respective rollers 176 supported on the pivot shaft 160 for the lower ends of the operating levers 158. Thus, as the operating cams 174 are rotated, high portions of the cams cause the rollers 176 and the pivot shaft 160 to be moved upwardly, causing upward movement of the lower ends of the operating levers 158, and downward movement of the upper ends of the operating levers respectively, as viewed in FIG. 3. The downward movement of the upper ends of the operating levers 158 causes downward movement of the lower clamping assembly 144, and at the same time causes upward flexing of the intermediate portion of the pressure plate 146, to flex the lower clamping assembly into an upward convex configuration as shown in FIG. 3. Thus, the lower clamping assembly 144 is moved into a lower open position for the feeding of one the sheets of film 46 into and out of the exposure position as above described. In this regard, it is to be understood that the deflection of the lower clamping assembly 144 in actual practice is only in the order of 1/16 of an inch, with the deflection thereof as shown in FIG. 3 being exaggerated for purposes of illustration.

When one of the sheets of film 46 has essentially reached the exposure position in the film exposure device 34, as shown in FIG. 4, low flat portions of the operating cams 174 engage the rollers 176 on the lever pivot shaft 160 and permit the coil springs 168 and the counterweights 170 to begin moving the lower clamping assembly 144 upwardly into clamping relationship with the sheet of film for a preselected dwell time, as shown in FIG. 4. During this upward movement of the lower clamping assembly 144, initial clamping engagement with the sheet of film 46 is made with the center of the sheet of film by the upward convex central portion of the lower x-ray intensifying screen 150. Subsequently, clamping engagement is made with the remainder of the sheet of film 46 by the lower x-ray intensifying screen 150 progressively outward from the center of the sheet of film to the leading and trailing ends thereof. Thus, clamping of the sheet of film 46 is accomplished in a uniform and progressive manner without producing any wrinkling of the film during the clamping operation. Air also is squeezed from the space between the x-ray intensifying screens 140 and 150 and the film 46, in a relatively gentle fashion, which minimizes vibration and subsequent film blurring.

Figure 5:
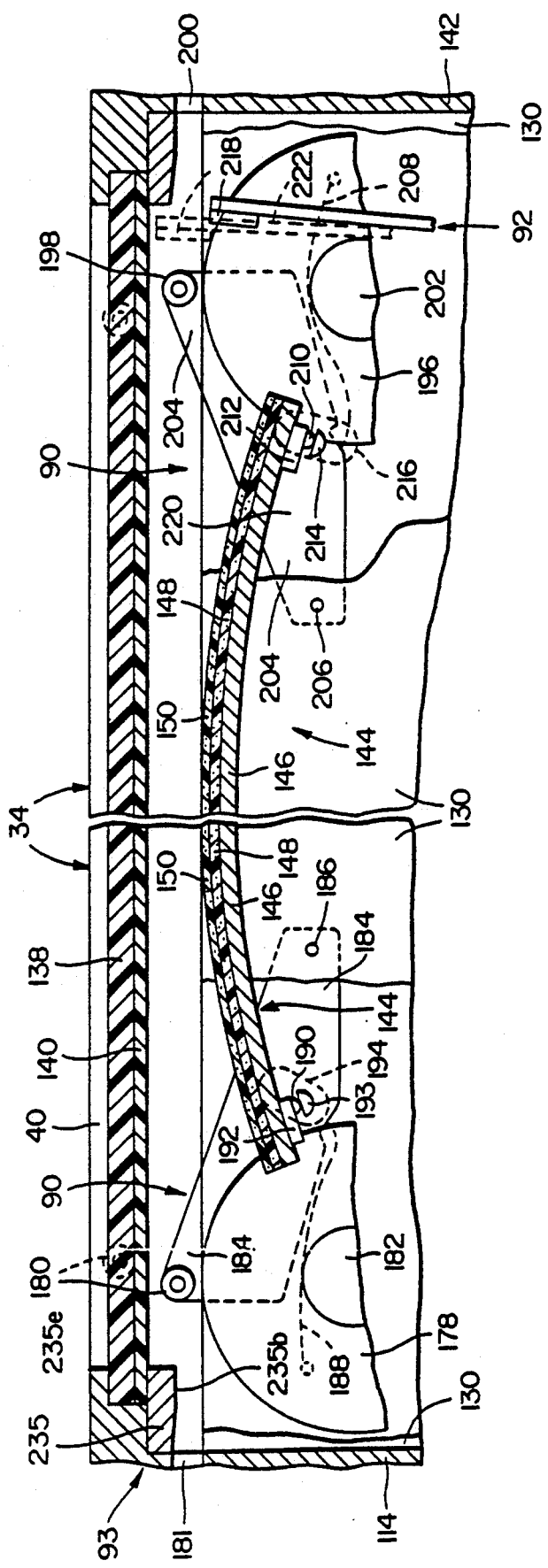
FIG. 5 is an enlarged elevational cross sectional view of entrance and exit portions of the film exposure device.

Referring to FIGS. 2 and 5, the film feeding mechanism 90 of the film exposure device 34 includes a pair of driven film feed-in wheels 178 (one shown in FIG. 5 in a slightly below normal position to facilitate illustration and a pair of respective feed-in pinch rollers 180 located adjacent opposite sides of the device and adjacent a horizontal film-entrance slot 181 in the end wall 114 of the device. When one of the sheets of film 46 is fed into the film exposure device 34 from the film magazine 32, side portions of the film at its leading end are engaged between the feed-in wheels 178 and feed-in rollers 180, and the driven feed-in wheels then advance the film into the exposure position in the film exposure device. After the film 46 has been fed into the exposure position, the lower film clamping assembly 144 is moved upwardly as above described and the feed-in rollers 180 are moved out of engagement with the film.

More specifically, the feed-in wheels 178 are rotatably mounted adjacent inner sides of the frame sidewalls 130 on a support shaft 182 having opposite ends fixedly mounted in respective ones of the sidewalls. The feed-in rollers 180 are supported above the frame sidewalls 130 on the upper ends of operating levers 184 located adjacent outer sides of the frame sidewalls and pivoted at lower ends on pins 186 mounted in the sidewalls. The feed-in rollers 180 are biased away from their film-engaging positions by leaf springs 188 (FIG. 5) having first ends pivoted on the side walls 130, with the leaf springs disposed over extensions of the support shaft 182 and having opposite ends engaged with the operating levers 184.

Referring to FIG. 5, pivoting of the feed-in rollers 180 from their inoperative positions into their film-engaging positions is accomplished by locking-type set screws 190 mounted in block members 192 secured to the underside of the pressure plate 146 adjacent its opposite sides. The set screws 190 are engaged with inwardly extending lugs 193 on the operating levers 184 intermediate their ends, with the lugs extending through suitable slots 194 in the sidewalls 130. Thus, as the lower clamping assembly 144 is moved downwardly to its open position as shown in FIG. 3, the set screws 190 pivot the operating levers 184 to move the feed-in rollers 180 into clamping engagement with the sheet of film 46. When the lower clamping assembly 144 moves back upwardly into its closed clamping position as shown in FIG. 4, the leaf springs 188 bias the operating levers 184 to move the feed-in rollers 180 out of engagement with the sheet of film 46.

Similarly, referring to FIGS. 2 and 5, the film feeding mechanism 90 includes a pair of driven feed-out wheels 196 (one also shown in a slightly below normal position to facilitate illustration) and a pair of respective feed-out pinch rollers 198 mounted adjacent respective ones of the frame sidewalls 130 and adjacent a film-exit slot 200 in the end wall 142 of the film exposure device 34. The feed-out wheels 196 and rollers 198 cooperate with the feed-in wheels 178 and rollers 180 to feed an exposed one of the sheets of film 46 out of the exposure position into the film-receiving cassette 36.

As in the case of the feed-in wheels 178, the feed-out wheels 196 are mounted adjacent inner sides of the frame sidewalls 130 on a drive shaft 202 having opposite ends mounted in respective ones of the sideways. The feed-out rollers 198 are mounted on the upper ends of operating levers 204 located adjacent outer sides of the sidewalls 130 and having lower ends pivoted on pins 206 mounted in the sidewalls. Referring to FIG. 5, the feed-out rollers 198 are biased toward inoperative positions by leaf springs 208 and are moved into film-engaging positions by locking-type set screws 210 in block members 212 mounted on the underside of the pressure plate 146, with the set screws being engaged with lugs 214 projecting from the operating levers through slots 216 in the sidewalls 130.

Thus, as in the case of the feed-in rollers 180, when the lower clamping assembly 144 is moved to its open position as shown in FIG. 3, the set screws 210 pivot the operating levers 204 to move the feed-out rollers 198 into their film-engaging positions, and when the lower clamping assembly is moved upwardly into its clamping position as shown in FIG. 4, the leaf springs 208 pivot the operating levers to move the feed-out rollers out of film engagement. Preferably, the feed-out wheels 196 are driven faster than the feed-in wheels 178 to preclude overfeed of one of the sheets of film 46 onto the previous sheet of film during a film changing operation, to reduce the possibility of film-jamming in the film exposure device 34.

The film stop mechanism 92 of the film exposure device 34 comprises an elongated stop-and-orienting bar 218 and a pair of pivoted assemblies 220 with the bar being movable between an upper position as shown in solid lines at the right-hand side of FIGS. 2 and 3 in the path of travel of one of the sheets of film 46 being fed into the exposure device, to limit feeding of the sheet of film into the device, and a lower position as shown in FIGS. 4 and 5, to permit feeding of the film out of the film exposure device 34 into the film-receiving cassette 36. The stop bar 218 extends essentially across the entire width of the film exposure device 34 so as to be engageable by an entire leading edge of each fed film 46, to help ensure proper location and orientation of the film for an exposure operation. The stop bar 218 is secured to upper ends of L-shaped members 222 of the pivoted assemblies 220, with lower rear ends of the L-shaped members secured to pivotable support members 224 mounted on the sidewalls 130 of the film exposure device by pivot pins 226 (FIGS. 2 and 3). Positive pivoting of the stop bar 218 between its upper and lower positions is accomplished by cams 228 on the main drive shaft 128 and a pivoted linkage wherein the cams are engaged with cam followers 230 (one shown in FIG. 3) on linkage levers 232 pivoted on the housing sidewalls 130 and connected to the pivotable members 224 by pivoted linkage rods 234.

As noted previously, in a film feeding operation, when the sheet of film 46 has essentially reached the exposure position and more specifically, so that its leading edge is approaching the feed-out rollers 198, the lower clamping assembly 144 begins to move upwardly toward its film clamping position as shown in FIG. 4, and the film stop mechanism 92 is moved into its upper position. At the same time, the feed-in rollers 180 move upwardly and disengage from the film sheet 46 and the feed-out rollers 198 move upwardly away from the path of the film sheet. The film sheet 46, as a result of its own forward momentum, then continues to travel forward against the stop bar 218 to become located and oriented in the film exposure device 34 for a film exposure operation.

Referring to FIG. 3, the film anti-bounce mechanism 93 includes a tapered wedge-shaped anti-bounce bar 235 secured to the bottom of the upper pressure plate 140 adjacent the film entrance slot 181 and extending transversely across the film exposure device 34. More specifically, as one of the sheets of film 46 is fed into the film exposure device 34 through the entrance slot 181 and under the anti-bounce bar 235, as illustrated by the lines 46' in FIG. 3, the upwardly curved lower pressure plate 150 causes the film to feed upward against the upper pressure plate 140. This causes the film 46 to become curved upward as shown by the lines 46', so that the film rides under the anti-bounce bar 235 in direct engagement with a smooth highly polished bottom surface 235b of the bar. This upward flexing of the film 46 against the anti-bounce bar 235 becomes further enhanced as the lower pressure plate 150 begins to close just before the leading edge of the film reaches the film stop bar 218, as previously discussed herein. Thus, as the leading edge of the film 46 engages the film stop bar 218 and becomes oriented thereby in the film exposure device 34, the trailing edge of the film, as a result of the upward flexing of the film, moves upward into engagement with a vertical edge 235e of the bar 235 as shown in FIG. 4. As a result, the bar edge 235e prevents the film 46 from "bouncing back" from the stop bar 218 and also cooperates therewith to retain the film in a proper oriented exposure position.

Each of the film sensing mechanisms 96i and 96o (FIG. 2) is in the form of an optical sensing device which utilizes infrared light, to which the x-ray film sheets 46 are not sensitive, for sensing purposes. The optical sensing devices 96i and 96o are mounted in spaced relationship adjacent the exit end of the film exposure device 34 with the optical sensing device 96i located forward of the optical sensing device 96o a distance on the order of 20% of the length of the sheets of film 46 being processed, so that when the film sensing device 96i is blocked by one of the sheets of film, at least 80% of the film is available for exposure purposes. The optical sensing device 96i may be mounted on either of the sidewalls 130, and the optical sensing device 96o is mounted on the intermediate wall 132 closely adjacent the end wall 142 of the film exposure device 34 so as to be able to sense one of the sheets of film 46 engaged against the film stop bar 218.

At the beginning of a film exposure sequencing operation, if the optical sensing devices 96i and 96o are not blocked, indicating that the film exposure device 34 is ready to receive one of the sheets of film 46 from the film magazine 32, upon energization of a "start" button (not shown) on a keyboard of the computer 30 (FIG. 1), the controller 28, under the direction of the computer, initiates a film feeding-and-exposure operation. If one of the sheets of film 46 initially feeds out of the film magazine 32 into the film exposure device 34, the optical sensing device 96i becomes blocked by the film and the film feeding cycle continues. If the film sheet 46 does not feed properly and the optical sensing device 96i remains unblocked, the controller 28, under the direction of the computer 30, will not immediately issue an exposure command to the x-ray generator 24, but continues its program. If the next film sheet 46 still does not feed (or does not cover film sensing device 96i), the cycle is aborted and a suitable "trouble" indicator (not shown) is energized.

If the film sheet 46 initially feeds so that the optical sensing device 96i becomes blocked, the controller 28, under the direction of the computer 30, issues an exposure command to the x-ray generator 24 even though the film sensing device 96o is not blocked by the film, since, as noted previously, the blocking of the film sensing device 96i by the film is an indication that at least 80% of the film is in an exposure position, which normally is sufficient to obtain an acceptable (but not preferable) x-ray under most circumstances. At the same time, the unblocked condition of the optical sensing device 96o provides an indication to the computer 30 that a film "short feed" condition has occurred, as for example, as a result of the film 46 not having fed against the film stop bar 218, or having "bounced back" therefrom. The first and any subsequent film "short feed" occurrences in the film exposure sequence then are counted by a film "short feed" counter 30SF (FIG. 1) in the computer 30, and when the number exceeds a preselected amount the computer can instruct the controller 28 to abort the sequence and a suitable "trouble" indicator (not shown) can be energized, if so desired, to show that corrective maintenance is required. Similarly, in the event that one of the sheets of film 46 in the sequence does not feed properly out of the exposure position, such that the optical sensing device 96o remains blocked by the sheet of film, this condition also can be sensed by the controller 28 and operation interrupted.

Where the film changer 22 is being used in conjunction with an angiographic injector 26, as illustrated in FIG. 1, if operation of the film changer is interrupted, operation of the angiographic injector, so as to stop the introduction of dye into the patient, is also interrupted. On the other hand, where two of the film changers 22 are being used in conjunction with the angiographic injector 26 as shown in FIG. 1, the computer 30 may be programmed such that even though one film changer is rendered inoperative, the other film changer and the angiographic injector remain operative and continue to produce x-rays.

Referring to FIG. 2, the indicia printing mechanism 98 includes an electronic liquid crystal display (LCD) 236 with a backlighted electroluminescent panel, a focusing lens 240 and a reflecting mirror 242. Prior to a film exposure operation, desired indicia, such as the date, patients's name and an x-ray film number, are set on the liquid crystal display 236 by an operator punching this information into the liquid crystal display from the keyboard of the computer 30. Where a series of x-rays are being produced, the sequential changing of the film members in the liquid crystal display 236, so as to provide a series of films with sequential numbering thereon, then is provided automatically by the computer 30. To produce the indicia on one of the sheets of film 46 in each film exposure operation, the liquid crystal display 236 is energized, causing the indicia then appearing on the liquid crystal display 236 to be focused by the lens 240 and reflected by the mirror 242 upwardly onto an edge portion of the film, to produce the desired indicia on the film in a bold white image on the dark exposed background of the film.

Referring to FIG. 2, the film feeding mechanism 90 of the film exposure device 34 includes a drive motor 244 supported on the bottom wall 102 and connected by a timing belt 246 to a sprocket 248 on the drive shaft 202 for the film feed-out wheels 196. The drive shaft 202 is connected by another sprocket 250 and a timing belt 252 to a sprocket 254 on the drive shaft 182 for the feed-in wheels 178. Thus, the wheels 178 and 196 are continuously driven with driving engagement of the wheels with one of the sheets of film 46 being commenced and interrupted by moving their respective pinch rollers 180 and 198 into and out of film-engaging positions as above described.

The speed of the drive motor 244 is controlled by a tachometer 256 comprising a light source transmitter-receiver device 258 mounted on the inner wall 132 of the film exposure device 34, and a peripherally slotted chopper wheel 260 mounted on a shaft (not shown) of the drive motor 244. Thus, the chopper wheel 260 periodically interrupts the light of the light source transmitter-device 258 to produce pulses representative of the speed of the drive motor, which are fed to a control circuit (not shown) of the computer 30, to provide a motor servo control system. The computer 30 then can determine if there is a problem with the servo drive system by monitoring the pulses when the "start" button is depressed on the computer keyboard and, if the motor 244 runs too slow or too fast, a suitable "trouble" indicator signal is issued to alert the operator.

With further reference to FIG. 2, operation of the cams 174 to permit the coil springs 168 and the counterweights 170 (FIGS. 3 and 4) to move the lower clamping assembly 144 into its upper clamping position, as shown in FIG. 4, is accomplished through a single-revolution clutch 262 of a known type. For example, the clutch 262 may include an internal drive spring (not shown) which drives the clutch one revolution upon the release of a retainer latch 264 pivoted on the bottom wall 102. The clutch 262 is operated by a sprocket 266 connected to a sprocket 268 on the feed-in wheel support shaft 182 by a timing belt 270. In operation, a solenoid 272 of the single-revolution clutch 262 is operated from the controller 28 to pivot the retaining latch 264 and render the clutch operative, whereupon the clutch rotates one revolution to feed one of the sheets of film 46 into the exposure position, and to operate the cams 174 and permit clamping of the sheet of film for an exposure operation.

Referring again to FIG. 1, each of the x-ray generators 24-1 and 24-2 normally has an inherent time delay, such as up to 50 ms, between the time at which the generator receives a command from the controller 28 to fire and the time at which the generator begins to produce x-rays for a film exposure. Accordingly, to increase the rate at which the films 46 can be processed to an optimum, particularly at relatively low film feeding speed rates, each of the generators 24-1 and 24-2 is given a firing command before the respective film 46 to be exposed actually reaches the exposure position in the associated film exposure device 34. For this purpose, the computer 30 includes a suitable variable time delay-comparator circuit 30D-C which can be programmed to vary this time delay on each film feeding cycle, in accordance with the measured speed of the drive motor 244, and thus the film 46.

More specifically, as is illustrated schematically in FIG. 1, and assuming that only the X-ray film changer 22-1 is operational, the pulses produced by its tachometer 256 for controlling the associated drive motor 244, also are fed to the variable delay-comparator circuit 30D-C, which includes a comparator for comparing the pulse rate to a pulse rate representative of a preselected time delay. For example, for the fastest x-ray film exposure rate, the preselected time delay may be selected to be slightly less (e.g., 20 ms) than the fastest possible time in which the x-ray generator 24-1 can be expected to fire. Then, upon receiving a signal from the tachometer 256 representative of the speed of the drive motor 244 as each film 46 is driven into the exposure position in the film exposure device 34, the variable time delay-comparator circuit 30D-C can determine the feed-in speed of that particular film and trigger the x-ray generator 24-1 at the appropriate time so that the generator fires at the same time that the film reaches and is clamped in the exposure position. Similarly, when both of the X-ray film changers 22-1 and 22-2 are operational, the variable delay-comparator circuit 30D-C can generate a time delay for both of the film changers based upon which of the respective motors 244 has the slowest motor and film feed-in speed at a particular time.

Figure 10:
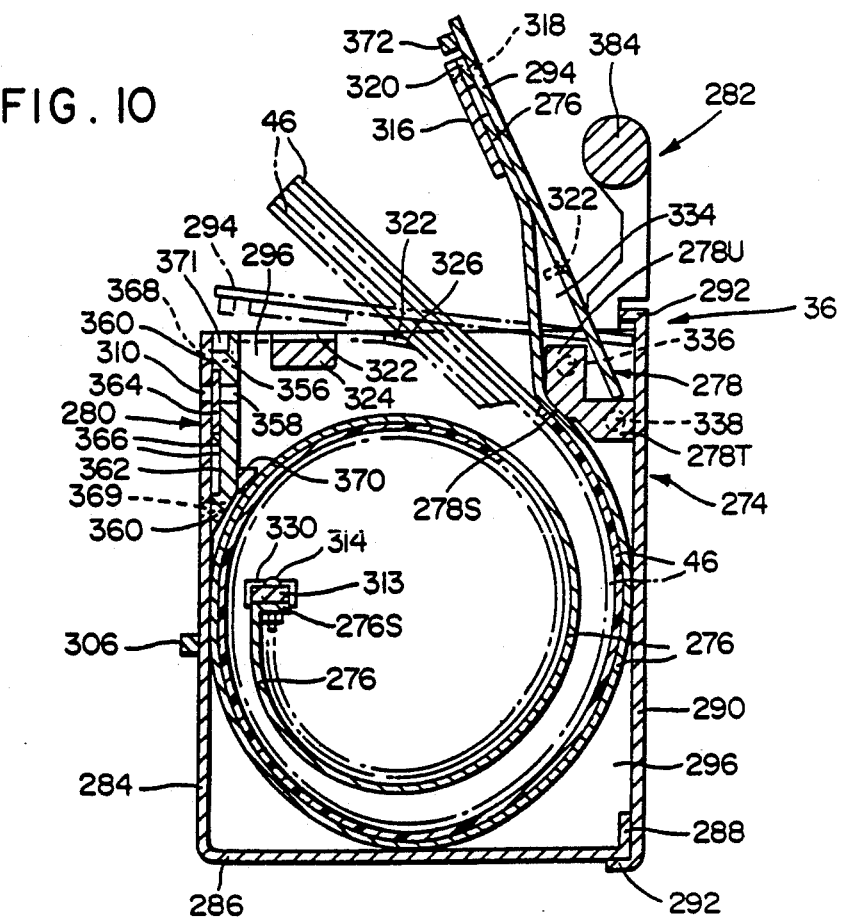
FIG. 10 is a cross-sectional view of the film-receiving cassette, showing the cassette removed from the film exposure device for removal of film from the cassette.

Referring to FIGS. 6-10, the film-receiving cassette 36, which is of a passive-type and which includes no film driving mechanism, comprises a box-shaped housing 274 and a spiral guide plate 276 in the housing which, as is best shown in FIGS. 9 and 10, defines an inner chamber for receiving exposed film 46. In addition, a guide plate reverse-bending anvil bar 278 (best shown in FIGS. 9 and 10) is mounted at the upper rear of the housing 274, a light-blocking gate assembly 280 is mounted at the front of the housing, and a combination carrying handle-latch mechanism 282 is pivotably mounted on the sides of the housing.

The box-shaped housing 274, which is of light-tight construction when closed, has a front wall 284 and a bottom wall 286 formed by an L-shaped member having an upwardly extending reinforcing flange 288 along a rear edge of the bottom wall. A back wall of the housing 274 is formed by a vertically disposed channel-shaped plates 290 having horizontally extending upper and lower reinforcing flanges 292, and a housing top is formed by a pivotably mounted cover plate 294. The box-shaped housing 274 further includes sidewalls in the form of opposite end plates 296 provided with molded plastic side covers 298 (shown only in FIG. 6). The L-shaped member 284, 286 and the back wall member 290 are secured to the end plates 296 by suitable screws 300 (FIG. 6), and the side covers 298 (FIG. 6) are secured to the end plates by standoff lugs 302 (FIGS. 6-8) screw-threaded into the end plates, and retaining screws 304 (FIG. 6) screw threaded into the standoff lugs.

The front wall 284 of the housing 274 includes an elongated fixed support-and-alignment bar 306 which is receivable in a guide slot 308 in the rear wall 142 of the film exposure device 34 when the film-receiving cassette 36 is mounted thereon, and which, as is clearly shown in FIGS. 8 and 9, functions as a light-sealing bar when received in the slot 308. The front wall 284 also includes a feed-in slot 310 through which film 46 is fed from the film exposure device 34 into the film-receiving cassette 36, and vertical slots 311 for receiving light gate operating lugs 312 on the film exposure device.

The spiral guide plate 276 has an inwardly spiraled configuration extending, for example, on the order of one and ¾360° turns, as illustrated in FIGS. 9 and 10, so as to define an outer open end and an inner end. The inner end of the spiral guide plate 276 terminates in a bent portion 276S directed radially inward and having a reinforcing bar 313 secured thereto by nut-and-bolt assemblies 314 (only one shown), to define a film stop. The spiral path of the guide plate 276 may be made longer or shorter at the time of manufactured, depending upon the length of the film 46 to be fed into the film-receiving cassette 36 and the guide plate preferably is formed of a smooth-surfaced material, such as polished aluminum, to prevent scratching and/or other damage to the film.

Referring further to FIGS. 9 and 10, the outer end of the spiral guide plate 276 is secured to the cover plate 294 by an elongated clamping plate 316 and screws 318 extending through apertures in the cover plate 294 and a spacer bar 320 and screw-threaded into the clamping plate. The clamping plate 316 is of slightly reduced width compared to the width of the spiral guide plate 276 so that when the cover 294 is closed, as shown in FIG. 9, opposite side portions of the spiral guide plate seat firmly against respective rubber, light-tight seals 322 disposed in grooves 324 (best shown in FIG. 10) formed in upper ends of the end plates 296. As is illustrated by the broken away portions in FIG. 9, each of the rubber seals 322 extends along the same spiral path as the guide plate 276.

More specifically, each rubber seal 322 extends from its respective groove 324 at the upper end of the associated end plate 296 along an arcuate shoulder portion 326 (best shown in FIG. 10) of the end plate, and then extends into an inwardly facing spiral groove 328 formed in an inner sidewall of the end plate as an extension of the shoulder portion. Similarly, the opposite edge portions of the spiral guide plate 276, in addition to being supported by the portions of the rubber seals 32 projecting above the upwardly facing upper grooves 324 of the end plates 296, are supported upon the portions of the rubber seals extending around the arcuate shoulders 326, and are received in the inwardly facing grooves 328 in the sidewalls of the end plates between the rubber seals and curved walls of these grooves. The spiral grooves 328 in the sidewalls of the end plates 296 terminate in rectangular recesses 330 which receive opposite ends of the reinforcing film stop bar 313, as illustrated in FIGS. 9 and 10, thus fixing the inner end of the spiral guide plate 276 against movement.

Referring again to FIGS. 9 and 10, the top cover 294 of the box-shaped housing 274 is secured by screws 332 to triangular-shaped hinge members 334 pivotably mounted on projecting lugs 336 at opposite ends of the elongated guide plate reverse-bending anvil bar 278, which is fixedly secured between the end plates 296 by screws 338. More specifically, the anvil bar 278 includes a trapezoidal-shaped portion 278T which receives the screws 338 and which has a tapered stepped surface 278S having an uppermost surface portion engageable by the spiral guide plate 276 when the cover 294 is opened, as shown in FIG. 10. An upwardly projecting portion 278U of the anvil bar 278, which includes the cover mounting lugs 336, is similarly engagable by the spiral guide plate 276 when the cover 294 is opened.

Figure 6:
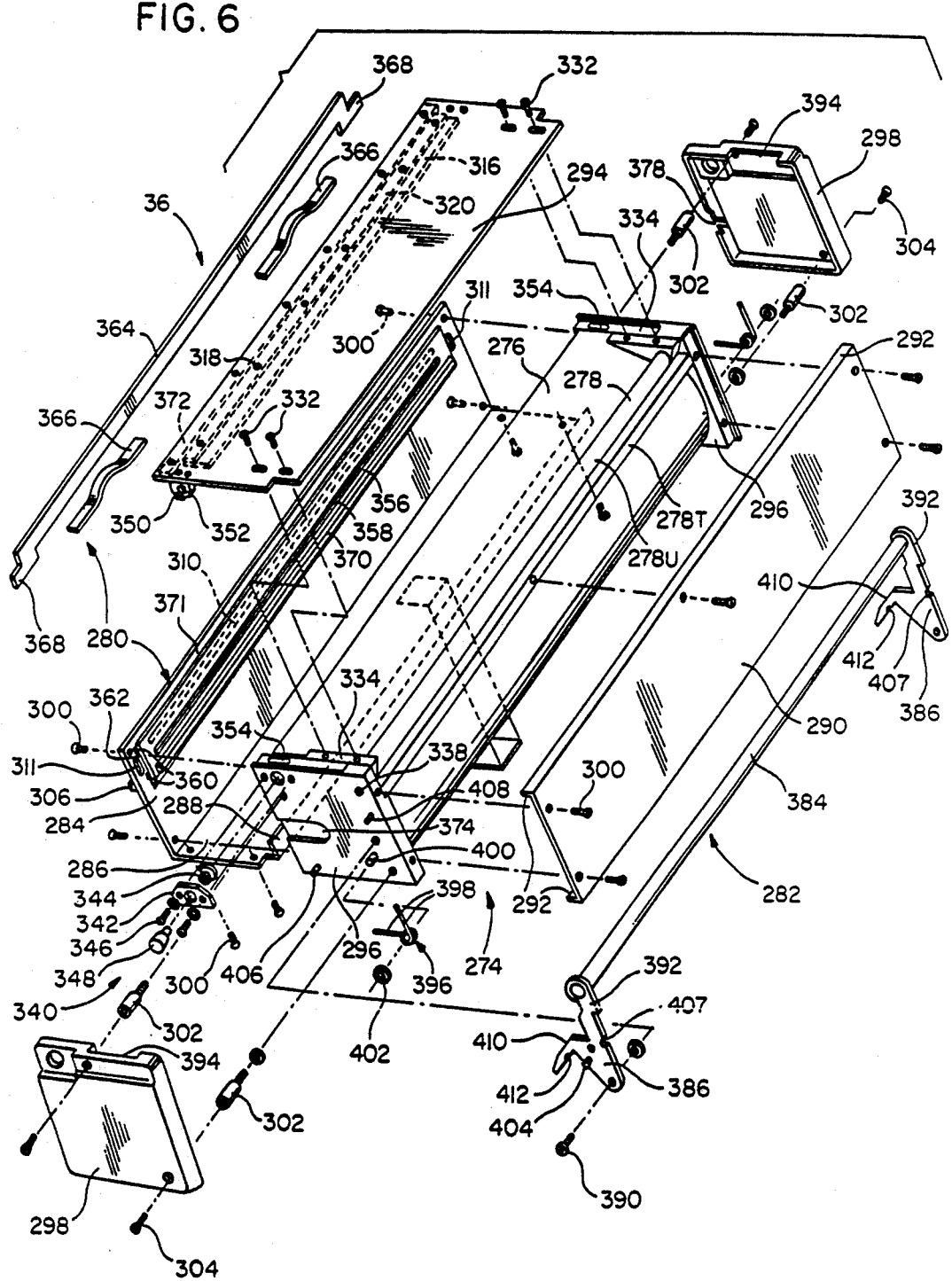
FIG. 6 is an isometric exploded view of a film-receiving cassette in accordance with the invention.
Figure 7:
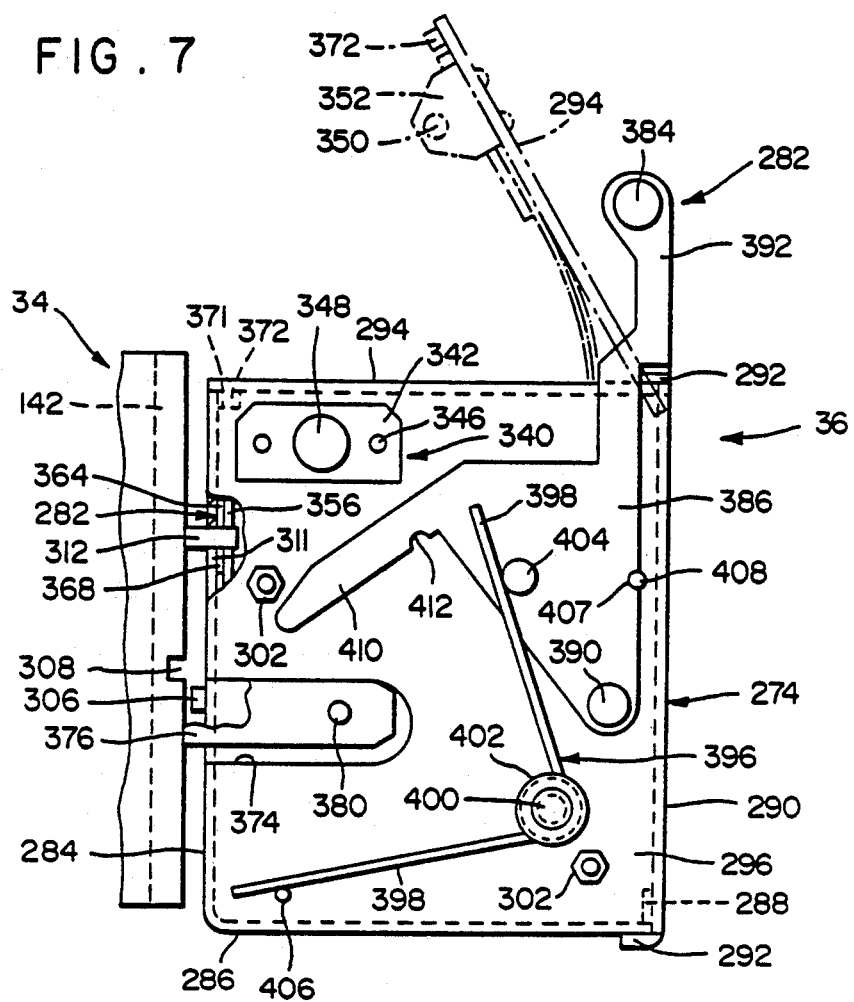
FIG. 7 is a side view of the film-receiving cassette, with a side cover removed, in a closed unlatched condition and illustrating a step in the mounting of the cassette on the film exposure device.

Referring to FIGS. 6, 7 and 8, the cover 294 is held locked in a film-receiving condition by spring-biased plunger mechanisms 340 mounted at upper forward end portions of each of the end plates 296. Each plunger mechanism 340 includes a mounting plate 342 having a slide bushing 344 (FIG. 6) fixed thereto, with the mounting plate 342 being secured to the associated end plate 296 by screws 346. Each plunger mechanism 340 also includes a retaining plunger 348 mounted in the slide bushing 344 and biased to a locking position by a coil spring (not shown) in the slide bushing, so as to be receivable in an aperture 350 in a depending locking lug 352, which is suitably secured to an inner side of the cover 294 and receivable in a slot 354 (FIG. 6) in the upper end of the associated end plate 296 when the cover is closed. Preferably, the plunger 348 of each plunger mechanism 340 is of a type which is rotatable into either of two positions, in one of which the plunger is biased into its locking position, and in the other of which the plunger is retained in a released position for opening of the cover 294.

When the film-receiving cassette 36 is not mounted on the film exposure device 34, the feed-in slot 310 in the cassette front wall 284 is closed by the light gate assembly 280, and when the cassette is mounted on the film exposure device, the feed-in slot is opened for feeding of film 46 into the cassette, as illustrated in FIG. 9. The light gate assembly 280 includes an elongated, channel-shaped plate member 356 having a film feed-in slot 358 in alignment with the feed-in slot 310 in the cassette front wall 284. The plate member 356 includes standoff flange portions 360 which define a guide slot 362 for a light gate in the form of an elongated rectangular plate or bar 364 movable between an upper light-blocking position as shown in FIG. 10 and a lower light-unblocking position, as shown in FIGS. 8 and 9. The light gate 364 is biased into its upper light-blocking position by one or more leaf springs 366 (FIGS. 6, 9 and 10) disposed between a lower end of the light gate and the lower flange 360 of the channel-shaped plate member 356. As is shown in FIGS. 6 and 8, opposite ends of the light gate plate 364 include projecting lugs 368 for moving the light gate from its upper light-blocking position, into its lower light-unblocking position, when the film-receiving cassette 36 is mounted on the film exposure device 34. The channel-shaped plate member 356 is secured to an inner side of the cassette front wall 284 by screws 369 and has an elongated light-sealing member 370, formed of a material such as sponge rubber, bonded thereto and disposed between the plate member and the spiral guide plate 276. The upper end of the plate member 356 also defines an elongated transversely extending slot 371 for receiving a light-sealing rib 372 on the cover 294 when the cover is in its closed condition, as shown in FIGS. 8 and 9.

Referring to FIGS. 2 and 6-8, each of the cassette end plates 296 includes a guide groove 374 for receiving a projecting guide member 376 on the film exposure device 34 with the guide groove having a greater vertical height than the guide member to permit vertical relative movement between the cassette 36 and the film exposure device when the cassette is mounted thereon. Each of the cassette side covers 298 also is provided with an opening 378 (shown at the upper right hand corner of FIG. 6) to permit the respective guide member 376, and a locking or latching pin 380 thereon, to pass through the side cover into the guide groove 374 in the respective end plate 296. Each guide member 376 is slidably mounted in a housing 377 (FIG. 2) on the adjacent film exposure device side wall 130 and biased to the left in FIG. 2 by a coil spring 376S.

Referring to FIGS. 6-8, the carrying handle-latch mechanism 282 includes a handle which comprises an elongated rod member 384 and a pair of essentially triangular plates 386 pivotably mounted on the cassette end plates 296 by shoulder screws 390. The rod 384 has reduced opposite end portions mounted in apertures in upper ends of respective projecting upper legs 392 of the triangular plates 386 and are retained in the apertures in a suitable manner, such as by small locking pins (not shown). As the carrying handle-latch mechanism 282 is moved between a released unlatched cassette-carrying position, as shown in FIG. 7, and a locking latched position, as shown in FIG. 8, the upper legs 392 of the triangular plates move in cut out slots 394 formed in the cassette side covers 298, as is shown in FIG. 6.

The carrying handle-latch mechanism 282 is biased into its carrying position as shown in FIG. 7, by coil-type wire springs 396 mounted on respective ones of the end plates 296 and having a pair of elongated biasing legs 398. For example, as is shown in FIG. 7, a coil portion of each spring 396 is mounted on a fixed pivot pin 400 extending from the adjacent end plate 296 and is retained on the pivot pin by a lock washer 402 received on the outside surface of the pivot pin. The first leg 398 of the coil spring 396 engages a projecting pin 404 on the adjacent triangular plate 386, and the second leg 398 engages a fixed pin 406 on the end plate 296, to retain the handle mechanism in a carrying position with an arcuate recess 407 in the triangular plate seated against a fixed stop pin 408 on the end plate.

With further reference to FIG. 7, each of the triangular plates 386 also includes a lower integral camming-locking leg 410 of essentially rigid construction. When the film-receiving cassette 36 is mounted on the film exposure device 34 and the carrying handle-latch mechanism 282 is moved from its carrying position to a locking position, as illustrated in FIG. 8, the camming-locking leg 410 engages the adjacent locking pin 380 on the projecting spring-loaded guide member 376 of the film exposure device 34, to securely lock the cassette 36 to the film exposure device, with the locking pin being received in a small arcuate seat 412 in the leg. At the same time, the elongated carrying rod 384 of the carrying handle-latch mechanism 282 engages over the forward portion of the top cover 294 to prevent inadvertent opening of the top cover during feeding of exposed film 46 from the film exposure device 34 into the cassette 36 during a film exposure operation.

To mount the film-receiving cassette 36 on the film exposure device 34, with the top cover 294 closed as shown in solid lines in FIG. 7, and the carrying handle-latch mechanism 282 in its unlocked carrying position, the cassette is positioned adjacent the film exposure device so that the projecting guide members 376 and locking pins 380 on the film exposure device are received through the openings 378 (upper right-hand corner of FIG. 6) in the cassette side covers 298 and into upper portions of the guide grooves 374 in the cassette end plates 296. The cassette 36 then is slid forward (to the left in FIG. 7) toward the film exposure device 34, with the cassette supported on the projecting guide members 376. At the same time, the small projecting lugs 312 on the film exposure device 34 are received through the slots 311 (FIGS. 6 and 7) in the front wall 284 of the cassette 36 into position over the upper edges of the lugs 368 on the light gate 364. At this time, the elongated light-sealing bar 306 on the cassette front wall 284 is located slightly below (e.g., ⅛ of an inch) the alignment slot 308 in the rear wall 142 of the film exposure device 34 as illustrated in FIG. 7.

The cassette 36 then is moved upward to align the bar 306 on the cassette front wall 284 with the alignment slot 308 in the rear wall 142 of the film exposure device 34, and then the cassette is moved forward (to the left in FIG. 7) to seat the bar in the slot, as shown in FIG. 8. During this upward movement of the cassette 36, the fixed lugs 312 on the film exposure device 34 cause the light gate 364 to be moved downward as illustrated in FIG. 8, to unblock the film feed-in slots 310 and 358 in the cassette front wall 284 and the channel-shaped member 356, respectively.

The carrying handle-latching mechanism 282 then is pivoted by an operator counterclockwise from the carrying position shown in FIG. 7, to the locking or latching position shown in solid lines in FIG. 8. During this movement of the carrying handle-latching mechanism 282, the camming-locking legs 410 initially engage the locking pins 380 on the projecting spring-loaded guide members 376 of the film exposure device 34 with a camming action, to pull the cassette 36 tightly into position on the film exposure device. Then, the locking pins 380 become engaged in the arcuate seats 412 in the camming-locking legs 410 to lock the cassette 36 securely into position on the film exposure device 34, with forward movement of one of the guide members 376 operating a switch 413 (FIG. 2) in the film exposure device 34, to provide an indication that the cassette is in a film-receiving position. At the same time, as noted previously, the carrying rod 384 of the handle mechanism 282 engages over the upper front portion of the top cover 294 to prevent inadvertent opening of the top cover as film 46 subsequently is fed into the film-receiving cassette 36 from the film exposure device 34. During this locking operation, the camming action of the legs 410 on the locking pins 380 and the subsequent engagement of the pins in the leg arcuate seats 412 also provide a tactile feedback to the operator to provide an indication of when the cassette 36 has become locked in film-receiving position.

Referring to FIG. 9, as one of the sheets of film 46 is fed from the film exposure device 34 into the film-receiving cassette 36 at the end initial exposure operation, the leading end of the film initially engages the interior surface of the spiral guide plate 276 and feeds along the interior surface such that the film assumes a spiral configuration corresponding to that of the guide plate, until the leading edge of the film strikes the inwardly directed stop 276S at the inner end of the guide plate. In this film feeding operation, the feed-out rollers 196 of the film exposure device 34 feed the film 46 at a speed such that, after the trailing end of the film leaves the feed-out rollers, the film continues to feed into the cassette 36 by inertia. This inertia-feed is facilitated by the spiral guide plate 276 extending in a spiral path corresponding to the length of the film 46 so that the film coils up completely within the spiral guide plate, without the leading edge of the film ever engaging a trailing portion of itself.

Subsequently, as the trailing end of the film 46 clears the feed-in slot 358 in the light gate channel-shaped guide member 356, the trailing end of the film "snaps" upwardly into a position in complementary engagement with the guide plate clamping member 316, as a result of the inherent coiled energy in the film, to enable the feeding of the next sheet of film 46 into the film-receiving cassette 36 without interference from the previously-fed sheet of film. Again, the inertia-feed of the film 46 by the film exposure device feed-out rollers 196 is facilitated as a result of the leading edge of the film never engaging a trailing portion thereof; further, since no leading portion of the previously fed film 46 is in engagement with itself (the film is completely coiled within the spiral guide plate 276), the second film need not be driven into a coiled position between engaged portions of the previous film, but is free to become coiled within the previous film by inertia. This feeding procedure may then be repeated with succeeding sheets of film 46 until the space within the spiral guide plate 276 has become filled with the sheets of film, whereupon the film-receiving cassette 36 may be removed from the film exposure device 34 and taken to a developing room for processing of the exposed films.

To remove the cassette 36 from the film exposure device 34, the carrying handle-latching mechanism 282 is moved from its locking position shown in solid lines in FIG. 8, back to its carrying position as shown in FIG. 7. During this movement, the camming-locking legs 410 of the carrying handle-latching mechanism 282 disengage from the locking pins 380 on the projecting guide members 376 of the film exposure device 34, permitting withdrawal of the cassette 36 therefrom. During the removal of the cassette 36, the light gate operating lugs 312 on the film exposure device 34 disengage from the lugs 368 on the light gate 364 and the light gate is moved upward to its light-blocking position with respect to the feed-in slot 310 in the cassette front wall 284, by the leaf springs 366.

In the developing room, the cover locking plungers 348 are moved to their release positions, whereupon the spiral guide plate 276, as a result of the inherent coiled energy therein, causes the top cover 294 to "pop open" a short distance, such as ¼ of an inch, as illustrated by broken lines in FIG. 10. The top cover 294 then is moved manually to its fully open position as shown in solid lines in FIG. 10, in which the spiral guide plate 276 becomes slightly reverse-bent about the anvil bar 278, as shown in that figure, to facilitate removal of the exposed films 46 from the cassette 36. In this regard, as is illustrated in FIG. 10, when the top cover 294 is opened, the trailing end portions of the exposed films 46, as result of inherent coiled energy in the films, also tend to "pop-up" into a position as shown in FIG. 10 in which they can readily be grasped for removal individually or en masse from the spiral guide plate 276 for development purposes.

In summary, there has been disclosed a compact X-ray film changer 22 which is especially suited for use with an angiographic inject-or 26. The film changer 22 includes, in the film exposure device 34, the film orienting-stop mechanism 92 and the anti-bounce bar 93, to ensure proper location and orientation of the film 46 for an exposure operation, the LCD 236 with the backlighted electroluminescent panel in the film printing mechanism 98, to provide simplified, high quality printing of the exposed films, the variable delay circuit 30D-C controlled by the motor speed control tachometer generator 256, for optimizing the film exposure rate, and the feed-in and feed-out optical sensor system 96i, 96o for more efficient operation. These features are combined with one another and the improved film-receiving cassette 36, comprising the carrying handle-latching mechanism 282, which facilitates positive securing and subsequent removal of the cassette from the film exposure device 34 with tactile feedback, and with the handle rod 384 also locking over the cassette top cover 294 to prevent inadvertent opening thereof; the light gate assembly 280 which is responsive to mounting of the cassette on the film exposure device; and the anvil member 278 by which the spiral guide plate 276 can be slightly reverse-bent when the cassette top cover is moved to an open position, to facilitate removal of the exposed film 46 from the cassette.

Various other modifications, adaptations and alternative designs are, of course, possible in light of the above teachings. Therefore, it should be understood at that this time that within the scope of the appended claims, the invention may be practiced otherwise than as specifically described herein.

What is claimed is:

1. A medical x-ray film processing device for an x-ray apparatus, which comprises:
   a medical x-ray film exposure device for holding a sheet of film during an x-ray film exposure operation;
   a cassette for receiving an exposed film from the film exposure device, the cassette being removably mounted on the film exposure device and comprising a film feed-in slot and a coil-shaped guide means so that film feeding through the feed-in slot and along interior surfaces of the guide means assumes a configuration corresponding to that of the guide means;
   film feeding means in the film exposure device for feeding an exposed film from the film exposure device into the cassette through the film feed-in slot after a film exposure operation;
   light-blocking means movably mounted on the cassette for preventing light from entering the cassette through the film feed-in slot;
   projecting supporting-and-alignment means on one of the film exposure device or the cassette and snugly receivable in corresponding supporting-and-alignment slot means in the other of the film exposure device or the cassette; and
   moving means on the film exposure device for engaging and moving the light-blocking means from covering relationship over the film feed-in slot into uncovering relationship with respect to the feed-in slot, in response to mounting of the cassette on the film exposure device so that the supporting and alignment means is located in the supporting-and-alignment slot means.

2. The medical x-ray film processing device as recited in claim 1, which further comprises:
   resilient means on the cassette for biasing the light-blocking means into covering relationship with respect to the film feed-in slot.

3. The medical x-ray film processing device as recited in claim 1, wherein the coil-shaped guide means extends in a spiral path in excess of one 360° turn and has an inner end with a radially inward-directed film stop.

4. The medical x-ray film processing device as recited in claim 1, wherein the coil-shaped guide means extends in a spiral path in excess of one and one-half 360° turns and has an inner end with a radially inward-directed film stop.

5. A cassette for receiving successively exposed films from an x-ray film exposure device, which comprises:
   a housing having an access opening for removing films from the cassette and having a film-receiving feed-in portion;
   guide means disposed in the cassette and having arcuate interior surface means for guiding films fed into the cassette, the arcuate interior surface means forming an inwardly facing, smooth and essentially continuous coil-shaped configuration having an outer open end and an inner end, such that an initial film fed into the open end of the coil-shaped configuration and fed along the arcuate interior surface means of the guide means assumes a configuration corresponding to that of the surface means and subsequently received films each nest in coiled relationship inside a respective previously received film, to facilitate storage of the films; and
   an access cover for the access opening of the housing, the access cover having a first end pivotably mounted on the housing and having a second end which opens upon pivoting of the cover, and the guide means having an entrance end fixed to the cover so that opening of the cover exposes an interior portion of the guide means for removal of film therefrom.

6. The cassette as recited in claim 5, which further comprises:
   anvil bar means for engaging the guide means and causing reverse-bending of the guide means when the cover is moved to an open position.

7. The cassette as recited in claim 5, which further comprises:
   light-blocking means movably mounted on the housing for preventing light from entering the cassette through a film feed-in slot, the light-blocking means being movable from covering relationship over the film feed-in slot into uncovering relationship with respect to the film feed-in slot in response to mounting of the cassette on the film exposure device.

8. The cassette as recited in claim 5, which further comprises:
   combination carrying handle-latch means movably mounted on the cassette, the combination carrying handle-latch means being movable between a latching position for securing the cassette to the film-exposure device, and a released unlatched cassette-carrying position for removal of the cassette from the film-exposure device.

9. The cassette as recited in claim 5, wherein the guide plate has a coil-shaped configuration extending in excess of one 360° turn and the inner end of the guide plate includes a radially inward-directed film stop.

10. The cassette as recited in claim 5, which further comprises:
    shoulders on sidewalls of the housing for supporting edge portions of the guide means when the access cover is closed.

11. The cassette as recited in claim 5, wherein:
    the cassette is of a passive-type having no film drive mechanism.

12. A cassette for receiving an exposed film from an x-ray film exposure device, which comprises:
    means for removably mounting the cassette on the film exposure device;
    a housing having a film feed-in slot and comprising coil-shaped guide means so that film fed through the feed-in slot and along interior surface means of the guide means assumes a configuration corresponding to that of the guide means;
    light-blocking means movably mounted on the housing for preventing light from entering the cassette through the film feed-in slot;
    supporting-and-alignment means for cooperating with corresponding mating supporting-and-alignment means on the film exposure device; and
    moving means on the light-blocking means for moving the light-blocking means from covering relationship over the film feed-in slot into uncovering relationship with respect to the feed-in slot, in response to mounting of the cassette on the film exposure device so that the cassette supporting-and-alignment means is located in mating relationship with the film exposure device supporting-and-alignment means.

13. The cassette as recited in claim 12, wherein the coil-shaped guide means extends in a spiral path in excess of one 360° turn and has an inner end with a radially inward-directed film stop.

14. The cassette as recited in claim 12, which further comprises:
resilient means for biasing the light-blocking means into covering relationship with respect to the film feed-in slot.

15. The cassette as recited in claim 12, wherein the coil-shaped guide means extends in a spiral path in excess of one and one-half 360° turns and has an inner end with a radially inward-directed film stop.

16. A medical x-ray film processing devide for an x-ray apparatus, which comprises:
a medical x-ray film exposure device for holding a sheet of film during an x-ray film exposure operation;
a cassette for receiving an exposed film from the film exposure device, the cassette being removably mounted on the film exposure device and comprising a film feed-in slot;
film feeding means in the film exposure device for feeding an exposed film from the film exposure device into the cassette through the film feed-in slot after a film exposure operation;
light-blocking means movably mounted on the cassette for preventing light from entering the cassette through the film feed-in slot;
projecting supporting-and-alignment means on one of the film exposure device or the cassette and snugly receivable in corresponding supporting-and-alignment slot means in the other of the film exposure device or the cassette;
moving means on the film exposure device for engaging and moving the light-blocking means from covering relationship over the film feed-in slot into uncovering relationship with respect to the feed-in slot, in response to mounting of the cassette on the film exposure device so that the supporting and alignment means is located in the supporting-and-alignment slot means;
latch means on the film exposure device for retaining the cassette on the film exposure device; and
combination carrying handle-latch means movably mounted on the cassette for securing the cassette to the film exposure device, the combination carrying-handle latch means being movable between a released unlatched cassette-carrying position and a latching position engaged with the latch means on the film exposure device.

17. A cassette for receiving an exposed film from an x-ray film exposure device, which comprises:
means for removably mounting the cassette on the film exposure device, said mounting means comprising combination carrying handle-latch means movably mounted on the cassette for securing the cassette to the film exposure device, the combination carrying handle-latch means being movable between a released unlatched cassette-carrying position and a latching position;
a housing having a film feed-in slot;
light-blocking means movably mounted on the housing for preventing light from entering the cassette through the film feed-in slot;
supporting-and-alignment means for cooperating with corresponding mating supporting-and-alignment means on the film exposure device; and
moving means on the light-blocking means for moving the light-blocking means from covering relationship over the film feed-in slot into uncovering relationship with respect to the feed-in slot, in response to mounting of the cassette on the film exposure device so that the cassette supporting-and-alignment means is located in mating relationship with the film exposure device supporting-and-alignment means.

18. A medical x-ray film processing device for an x-ray apparatus, which comprises:
a medical x-ray film exposure device for holding a sheet of film during an x-ray film exposure operation;
a cassette for receiving successively exposed films from the film exposure device, the cassette having an access opening for removing films from the cassette;
guide means disposed in the cassette and having arcuate interior surface means for guiding films fed into the cassette from the exposure device, the arcuate surface means forming an inwardly facing, smooth and essentially continuous coil-shaped configuration having an outer open end and an inner end, such that an initial film fed into the open end of the coil-shaped configuration and fed along the arcuate interior surface means of the guide means assumes a coil-shaped configuration corresponding to that of the surface means, and subsequently received films each nest in coiled relationship inside a respective previously received film, to facilitate storage of the films;
an access cover for the access opening of the cassette, the access cover having a first end pivotally mounted on the cassette and having a second end which opens upon pivoting of the cover, and the guide means having an entrance end fixed to the cover so that opening of the cover exposes an interior portion of the guide means for removal of film therefrom; and
film feeding means in the film exposure device for feeding an exposed film from the film exposure device into the cassette and along the arcuate interior surface means of the guide means after a film exposure operation.

19. The medical x-ray film processing device as recited in claim 18, which further comprises:
anvil bar means for engaging the guide means and causing reverse-bending of the guide means when the cover is moved to an open position.

20. The medical x-ray film processing device as recited in claim 18, which further comprises:
light-blocking means movably mounted on the cassette for preventing light from entering the cassette through a film feed-in slot of the cassette; and
means on the film exposure device for engaging and moving the light-blocking means from covering relationship over the film feed-in slot into uncovering relationship with respect to the feed-in slot, in response to mounting of the cassette on the film exposure device.

21. The medical x-ray film processing device as recited in claim 20, wherein the light-blocking means is an elongated bar member.

22. The medical x-ray film processing device as recited in claim 18, which further comprises:
 latch means on the film exposure device for retaining the cassette on the film exposure device; and
 combination carrying handle-latch means movably mounted on the cassette, the combination carrying handle-latch means being movable between a latching position engaged with the latch means on the film exposure device, for securing the cassette to the film-exposure device, and a released unlatched cassette-carrying position disengaged from the latch means on the film exposure device, for removal of the cassette from the film-exposure device.

23. The medical x-ray film processing device as recited in claim 18, wherein the guide means has a coil-shaped configuration extending in excess of one 360° turn and the inner end of the guide means includes a radially inward-directed film stop.

24. The medical x-ray film processing device as recited in claim 18, which further comprises:
 shoulders on sidewalls of the cassette for supporting edge portions of the guide means when the access cover is closed.

25. The medical x-ray film processing device as recited in claim 18, wherein:
 the film-receiving cassette is of a passive-type which includes no film drive mechanism.

26. The medical x-ray film processing device as recited in claim 18, which further comprises:
 feed means for feeding an unexposed sheet of film into an exposure position in the film exposure device;
 an x-ray generator for producing x-rays to expose the film in the film exposure device; and
 means for transmitting a firing command to the x-ray generator before the unexposed sheet of film reaches the exposure position in the film exposure device.

27. The medical x-ray film processing device as recited in claim 26, which further comprises:
 means for measuring the speed of the film as it approaches the film exposure position; and
 programmable timing circuit delay means for varying the delay between the time at which the firing command is transmitted to the x-ray generator and the time at which the unexposed film reaches the exposure position, in response to the speed of the film as determined by the measuring means.

28. The medical x-ray film processing device as recited in claim 27, wherein the film speed measuring means comprises tachometer means for measuring pulses produced by a film drive motor of the film feeding means.

29. The medical x-ray film processing device as recited in claim 28, wherein the tachometer means comprises:
 a continuously operating light source;
 a light receiver; and
 a chopper wheel driven by the film drive motor and interposed between the light source and the light receiver.

30. The medical x-ray film processing device as recited in claim 29, wherein the tachometer means also provides a feedback signal for controlling the speed of the film drive motor.

31. The medical x-ray film processing device as recited in claim 18, which further comprises:
 clamping means movable from an open position to a closed position in the film exposure device for clamping the sheet of film for the x-ray film exposure operation;
 feed means for feeding the sheet of film through an entrance slot of the film exposure device and into an exposure position between the clamping means when the clamping means is in the open position; and
 an elongated stop-and-orienting bar extending essentially across the width of the film exposure device for precluding overfeed of the sheet of film into the exposure position and for orienting the sheet of film in the exposure position, the stop-and-orienting bar being mounted for movement into and out of a path of travel of the fed film.

32. The medical x-ray film processing device as recited in claim 31, which further comprises:
 pivotably mounted lever means for moving the stop-and-orienting bar; and
 drive means including a drive shaft, for operating the clamping means, the film feeding means and the stop-and-orienting bar lever means, the drive shaft including first cam means for operating the clamping means and the film feeding means, and second cam means for operating the stop-and-orienting bar lever means in synchronism with the clamping means and the film feeding means.

33. The medical x-ray film processing device as recited in claim 31, which further comprises film anti-bounce bar means for preventing film from bouncing back upon engaging the elongated stop-and-orienting bar, the anti-bounce bar means being disposed transversely with respect to the film exposure device at the entrance slot of the film exposure device and having an edge engageable by a trailing edge of the sheet of film.

34. The medical x-ray film processing device as recited in claim 18, wherein another film feeding means comprises:
 an essentially Z-shaped member having an upper leg, an intermediate leg and a lower leg, the upper leg extending through an aperture in a front wall of the film exposure device for operating a film feeding mechanism in an associated film magazine;
 reciprocating means connected to the intermediate leg of the Z-shaped member; and
 guide means mounted on a bottom wall of the film exposure device for guiding the lower leg for reciprocating movement.

35. The medical x-ray film processing device as recited in claim 18, which further comprises:
 clamping means for clamping a sheet of x-ray film in an exposure position in the film exposure device for the x-ray film exposure operation;
 feed means for feeding sheets of film sequentially into and out of the exposure position for respective exposure operations; and
 electronic means for forming indicia, including sequential film numbers, on edge portions of the sheets of film during the exposure operations.

36. The medical x-ray film processing device as recited in claim 35, which further comprises:
 liquid crystal display means including a backlighted electroluminescent panel, forming part of the electronic indicia forming means, for producing an image of the indicia to be formed on the sheets of film; and means for controlling the image produced by the liquid crystal display means, including the sequential film numbers, to control the indicia formed on the sheets of film.

37. The medical x-ray film processing device as recited in claim 18, which further comprises:
first optical sensing means spaced a preselected distance from an exit end of the film exposure device for sensing when a film has been fed from the film magazine into the film exposure device a sufficient distance to obtain an acceptable film exposure;
second optical sensing means adjacent the exit end of the film exposure device for sensing when the film has not been fed completely into the film exposure device, producing a "short feed" film condition; and
means for counting the "short feed" film condition occurrences in a film sequence and deenergizing the system when a preselected number of "short feed" film conditions occurs in the sequence.

38. The medical x-ray film processing device as recited in claim 23, wherein the guide means has a coil-shaped configuration extending in excess of one and one-half 360° turns and the inner end of the guide means includes a radially inward-directed stop.

* * * * *

UNITED STATES PATENT AND TRADEMARK OFFICE
CERTIFICATE OF CORRECTION

PATENT NO. : 5,263,077
DATED : November 16, 1993
INVENTOR(S) : Kevin P. COWAN ET AL.

It is certified that error appears in the above-identified patent and that said Letters Patent is hereby corrected as shown below:

On the title page,

In [75], change "Joseph B. Havrill" to --Joseph B. Havrilla--.

Signed and Sealed this

Twenty-fourth Day of May, 1994

Attest:

BRUCE LEHMAN

*Attesting Officer*      *Commissioner of Patents and Trademarks*